US008511344B2

(12) United States Patent
Guo et al.

(10) Patent No.: US 8,511,344 B2
(45) Date of Patent: Aug. 20, 2013

(54) GAS FEED INJECTOR APPARATUS

(75) Inventors: Cliff Yi Guo, Sugar Land, TX (US); Dhaval Bharat Mistry, Houston, TX (US)

(73) Assignee: General Electric Company, Schenectady, NY (US)

( * ) Notice: Subject to any disclaimer, the term of this patent is extended or adjusted under 35 U.S.C. 154(b) by 833 days.

(21) Appl. No.: 12/357,448

(22) Filed: Jan. 22, 2009

(65) Prior Publication Data

US 2010/0180965 A1  Jul. 22, 2010

(51) Int. Cl.
 *B01J 8/22* (2006.01)
 *F02B 43/00* (2006.01)
 *F17D 1/04* (2006.01)

(52) U.S. Cl.
 USPC ....... 137/592; 137/599.03; 261/37; 48/127.9; 60/39.12

(58) Field of Classification Search
 USPC .............. 137/590, 592, 597, 599.03; 261/37, 261/98; 48/127.9; 60/39.12
 See application file for complete search history.

(56) References Cited

U.S. PATENT DOCUMENTS

| | | | | | |
|---|---|---|---|---|---|
| 1,500,283 | A | * | 7/1924 | Stinson | 261/64.3 |
| 2,586,499 | A | * | 2/1952 | Anderson | 261/128 |
| 3,752,452 | A | * | 8/1973 | Iannelli | 261/52 |
| 4,011,733 | A | * | 3/1977 | Kuckens et al. | 62/59 |
| 4,705,535 | A | * | 11/1987 | Lipp | 48/77 |
| 2006/0231645 | A1 | * | 10/2006 | Chan | 239/424 |
| 2007/0289214 | A1 | | 12/2007 | Briesch et al. | |

\* cited by examiner

*Primary Examiner* — Craig Schneider
*Assistant Examiner* — Atif Chaudry
(74) *Attorney, Agent, or Firm* — Cantor Colburn LLP

(57) ABSTRACT

According to one aspect of the invention, a gas feed injector apparatus includes a mounting flange having an internal surface, a first internal gas inlet pipe coupled to the mounting flange, a second internal gas inlet pipe coupled to the mounting flange and an internal gas injection header coupled to the first and second internal gas inlet pipes.

20 Claims, 3 Drawing Sheets

GAS FEED INJECTOR APPARATUS

BACKGROUND OF THE INVENTION

The subject matter disclosed herein relates to injectors and more specifically to $CO_2$ recycle headers for injectors in the gasification process.

Known combined cycle power systems used for power generation can include a gasification system that is integrated with at least one power-producing turbine system. For example, known gasifiers convert a mixture of fuel, air or oxygen, steam, and/or limestone into an output of partially oxidized gas, sometimes referred to as "syngas." Syngas is supplied to the combustor of a gas turbine engine, which powers a generator that supplies electrical power to a power grid. Exhaust from at least some known gas turbine engines is supplied to a heat recovery steam generator that generates steam for driving a steam turbine. Power generated by the steam turbine also drives an electrical generator that provides additional electrical power to the power grid.

At least some known gasification systems use at least one feed injector to supply fuel into a reactor vessel coupled within the gasification system. Current liquid-fed injectors can also inject recycled $CO_2$ into the gasifier in order to improve the syngas composition. The injector, incorporated with the $CO_2$ injection header, is used independent of the feedstock. Known feed injectors are exposed to temperature extremes within the reactor vessel of the gasifier. Specifically, the tips of known feed injectors are exposed to reaction temperatures that may inhibit effective operation of the feed injectors and/or shorten the life span of the feed injectors. Additionally, known feed injectors are also exposed to corrosive elements in the syngas flowing within the reactor vessel. Over time, exposure to such elements may adversely affect the operation and/or shorten the life span of known feed injectors.

To facilitate reducing damage to the feed injectors, at least some known gasification systems use a closed-loop water system to supply cooling water to the feed injector. However, the cooling systems often do not adequately reduce the surface temperature of the feed injectors.

BRIEF DESCRIPTION OF THE INVENTION

According to one aspect of the invention, a gas feed injector apparatus is provided. The gas feed injector apparatus includes a mounting flange having an internal surface, a first internal gas inlet pipe coupled to the mounting flange, a second internal gas inlet pipe coupled to the mounting flange and an internal gas injection header coupled to the first and second internal gas inlet pipes.

According to another aspect of the invention, a gas feed injector assembly is provided. The gas feed injector assembly includes a mounting flange having an internal surface and an injector barrel coupled to the mounting flange. The gas feed injector assembly further includes a first internal gas inlet pipe coupled to the mounting flange, a second internal gas inlet pipe coupled to the mounting flange and an internal gas injection header coupled to the first and second internal gas inlet pipes.

According to yet another aspect of the invention, a gasifier is provided. The gasifier includes a gasifier housing having a reaction zone, a mounting flange having an internal surface and coupled to the gasifier housing and an injector barrel coupled to the mounting flange and configured to provide fuel to the reaction zone. The gasifier further includes a first internal gas inlet pipe coupled to the mounting flange, a second internal gas inlet pipe coupled to the mounting flange and an internal gas injection header coupled to the first and second internal gas inlet pipes, wherein the first and second internal gas inlet pipes are configured to provide gas into the reaction zone.

These and other advantages and features will become more apparent from the following description taken in conjunction with the drawings.

BRIEF DESCRIPTION OF THE DRAWING

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

The detailed description explains embodiments of the invention, together with advantages and features, by way of example with reference to the drawings.

DETAILED DESCRIPTION OF THE INVENTION

The embodiments described herein define $CO_2$ as the exemplary gas implemented in the feed injector. However, it is appreciated that other gases are contemplated in other exemplary embodiments.

Figure 1:
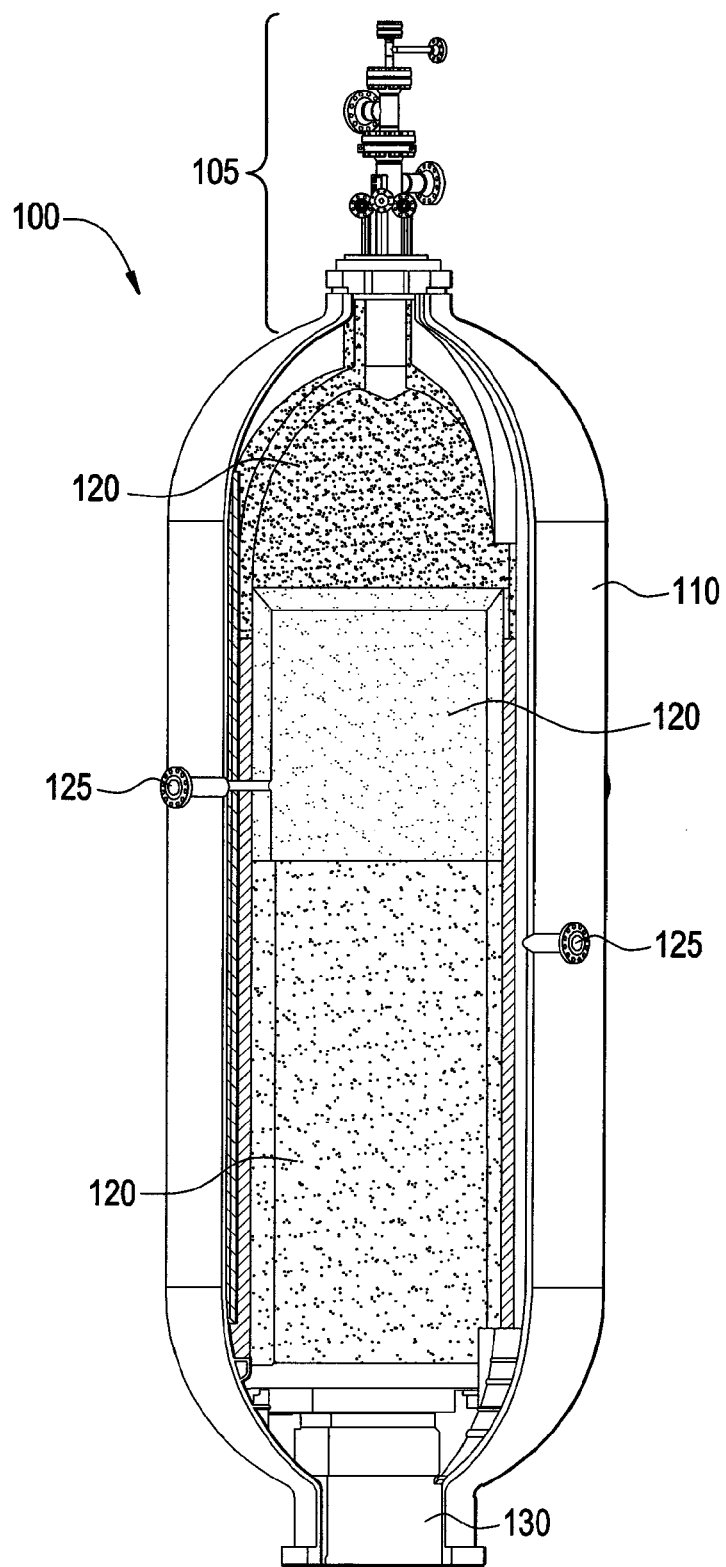
FIG. 1 illustrates a gasifer including a $CO_2$ feed injector disposed on an injector assembly in accordance with exemplary embodiments.

FIG. 1 illustrates a gasifer 100 including a $CO_2$ feed injector disposed on an injector assembly 105 in accordance with exemplary embodiments. The gasifier 100 includes an injector assembly 105, which is described further with respect to FIG. 2. The gasifier 100 can further include a gasifier housing 110, which can include one or more reaction zones 120 in which syngas is generated as known in the art. The gasifier 100 can include one or more ports 125 from which syngas or gas byproducts can be measured for temperature from the housing 110. The gasifier can further include a neck 130 that channels the unused by-products from the gasifier 100 to the next stage in the gasification process.

Figure 2:
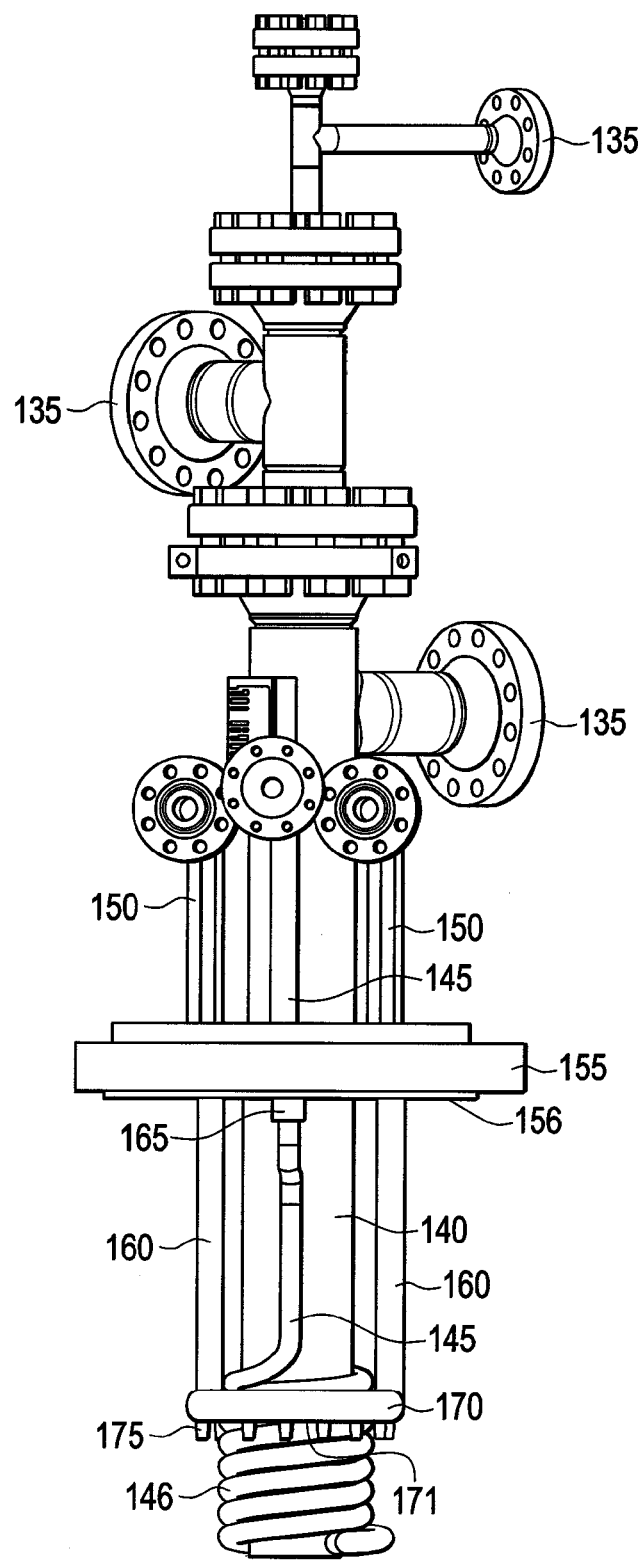
FIG. 2 illustrates the injector assembly of FIG. 1 in accordance with exemplary embodiments.

FIG. 2 illustrates the injector assembly 105 of FIG. 1 in accordance with exemplary embodiments. The injector assembly 105 can include one or more injector inlets 135 for providing fuel and other gases into the gasifier 100. The injector assembly 105 can further include an injector barrel 140 in fluid communication with the injector inlets 135. The injector assembly 105 can further include cooling coil inlets 145 that receive coolant from an external source for cooling the injector barrel 140. The cooling coil inlets 145 are in fluid communication with cooling coils 146 that are configured to reduce operating temperatures of the injector barrel 140 and the outer tip of the injector. The injector barrel 140 is configured to provide fuel into the reactions zones 120 of the gasifier 100. Fuel from the injector barrel 140 can be combined with other substances such as oxygen.

In exemplary embodiments, the fuel from the injector barrel 140 can also be combined with recycled $CO_2$ that can be fed from external $CO_2$ inlet pipes 150. In exemplary embodiments, the injector assembly 105 is coupled to the gasifier housing 110 via a mounting flange 155 through which the external $CO_2$ inlet pipes 150 are fitted. The injector assembly 105 further includes internal $CO_2$ inlet pipes 160 that are in fluid communication with the external $CO_2$ inlet pipes 150. The internal $CO_2$ inlet pipes 160 are coupled to the mounting flange 155 via $CO_2$ header inlet pipe couplings 165 on an internal surface 156 of the mounting flange 155. The injector assembly 105 further includes a $CO_2$ injection header 170 having $CO_2$ injection nozzles 175. The $CO_2$ injection header 170 is in fluid communication with and oriented substantially perpendicular to internal $CO_2$ inlet pipes 160. In exemplary embodiments, the $CO_2$ injection nozzles 175 protrude from and are disposed substantially perpendicular to a surface 171 of the $CO_2$ injection header 170. In addition, the $CO_2$ injection nozzles 175 are substantially parallel to the internal $CO_2$ inlet pipes 160.

Figure 3:
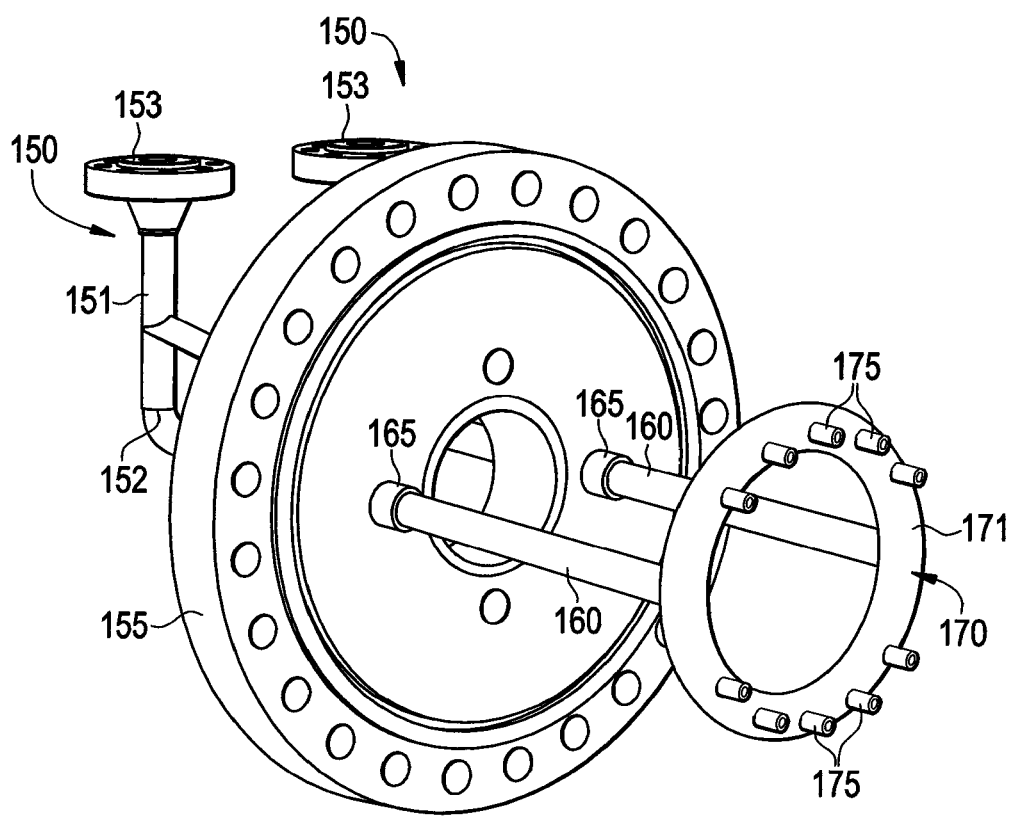
FIG. 3 illustrates an exemplary $CO_2$ feed injector.

The mounting flange 155 in combination with the external and internal $CO_2$ inlet pipes 150,160, the $CO_2$ inlet pipe couplings 165, the $CO_2$ injection header 170 and the $CO_2$ injection nozzles 175 are illustrated in FIG. 3 and is collectively referred to as the $CO_2$ feed injector. The $CO_2$ feed injector is shown in isolation from the other components of the gasifer 100 and the injector assembly for illustrative purposes. In exemplary embodiments, the external $CO_2$ inlet pipes 150 include a first portion 151 that is substantially parallel to the mounting flange 155 and a second portion 152 that is substantially perpendicular to the first portion 151 and to the mounting flange 155. The second portion 152 is co-parallel with the corresponding internal $CO_2$ inlet pipe 160. The first portion can include $CO_2$ header inlet flanges 153 configured to couple with a recycled $CO_2$ source. In exemplary embodiments, the perpendicular orientation of the first portion 151 with the second portion 152 reduces or eliminates a $CO_2$ gas stagnant zone in the $CO_2$ injection header 170 that can occur when inlet pipes are arranged perpendicular to injection headers in the prior art. In exemplary embodiments, as illustrated, the $CO_2$ feed injector includes two external and internal $CO_2$ inlet pipes 150,160, arranged substantially parallel and spaced 180° from one another about the mounting flange 155.

In exemplary embodiments, the internal $CO_2$ inlet pipes 160 fixed at a length that maintains the $CO_2$ injection header 170 out of the reaction zones 120 in the gasifier 100. For example, the $CO_2$ injection header 170 can be positioned proximate of the injector barrel 140 such that $CO_2$ is injected into the fuel stream from the injector barrel upstream of the reaction zones 120. In this way, the $CO_2$ can still be injected into the fuel stream, while significantly reducing a surface temperature of the $CO_2$ injection header 170 by as much as 50%. For example, it has been determined that the reduction of the internal $CO_2$ inlet pipes 160 by 16 inches (from 35 inches to 19 inches), thereby removing the $CO_2$ injection header 170 from the reaction zones 120 resulted in a temperature reduction from 2279° F. to 1192° F.

In exemplary embodiments, the $CO_2$ inlet pipe couplings 165 can be extended over the length of the internal $CO_2$ inlet pipes 160 in order to increase the stiffness for the internal $CO_2$ inlet pipes 160. For example, for the 19 inch internal $CO_2$ inlet pipes 160 in the example above, the $CO_2$ inlet pipe couplings 165 can be 3 inches. This length results in an increased isolation from vibration sources, such as the $CO_2$ source. For example, a natural $CO_2$ inlet pipe frequency can be about 60 Hz when spraying $CO_2$ into the gasifier. By increasing the length of the $CO_2$ inlet pipe couplings 165, the natural frequency of the internal $CO_2$ inlet pipes 160 is increased, thereby reducing or eliminating the vibration caused at 60 Hz from external $CO_2$ pumps. For example, for the three inch increase in the $CO_2$ inlet pipe couplings 165 as described above, the natural frequency of the internal $CO_2$ inlet pipes 160 is increased to 71.5 Hz. As such, it is appreciated that the length of the $CO_2$ inlet pipe couplings 165 is selected to change the natural frequency of the internal $CO_2$ inlet pipes 160 from a natural frequency induced from $CO_2$ flowing through the internal $CO_2$ inlet pipes 160.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A gas feed injector apparatus, comprising:
   a mounting flange having an internal surface, and configured to be coupled to a gasifier housing with a reaction zone for supporting a syngas reaction in a temperature range of up to about 2279° F.;
   a first internal gas inlet pipe coupled to the mounting flange;
   a second internal gas inlet pipe coupled to the mounting flange;
   a cooling coil inlet coupled to the mounting flange;
   cooling coils coupled to the cooling coil inlet, and configured to be positioned internally in a gasifier housing; and
   an internal gas injection header coupled to the first and second internal gas inlet pipes, and configured to inject a first gas, the internal gas injection header positioned outside the reaction zone and subject to temperatures of about 1192° F.,
   wherein the mounting flange is configured to receive a gas injector barrel in a position adjacent the internal gas injection header and the cooling coils, and configured to inject fuel to mix with the first gas, and wherein the cooling coils are positioned around the gas injector barrel.

2. The apparatus as claimed in claim 1 wherein the first gas is $CO_2$.

3. The apparatus as claimed in claim 2 wherein the first internal gas inlet pipe is spaced substantially 180° from the second internal gas inlet pipe.

4. The apparatus as claimed in claim 1 further comprising:
   a first external gas inlet pipe coupled to the mounting flange and to the first internal gas inlet pipe; and
   a second external gas inlet pipe coupled to the mounting flange and to the second internal gas inlet pipe.

5. The apparatus as claimed in claim 4 wherein the first and second first external gas inlet pipes each include a first portion oriented substantially perpendicular to the first and second internal gas inlet pipes, and a second portion substantially parallel to the first and second gas inlet pipes.

6. The apparatus as claimed in claim 1 further comprising gas inlet pipe couplings disposed on each of the first and second internal gas inlet pipes at the internal surface of the mounting flange.

7. The apparatus as claimed in claim 6 wherein a length of the gas inlet pipe couplings is selected to change a natural frequency of the first and second external gas inlet pipes from a natural frequency induced from gas flowing through the first and second internal gas inlet pipes.

8. A gas feed injector assembly, comprising:
a mounting flange having an internal surface, and configured to be coupled to a gasifier housing with a reaction zone for supporting a syngas reaction in a temperature range of up to about 2279° F.;
an injector barrel coupled to the mounting flange;
a first internal gas inlet pipe coupled to the mounting flange;
a second internal gas inlet pipe coupled to the mounting flange;
a cooling coil inlet coupled to the mounting flange;
cooling coils coupled to the cooling inlet, and configured to be positioned internally in a gasifier housing around the gas injector barrel; and
an internal gas injection header coupled to the first and second internal gas inlet pipes, and configured to inject a first gas, the internal gas injection header positioned outside the reaction zone and subject to temperatures of about 1192° F.,
wherein the gas injector barrel is adjacent the internal gas injection header and the cooling coils, and configured to inject fuel to mix with the first gas.

9. The assembly as claimed in claim 8 wherein the first internal gas inlet pipe is arranged substantially parallel to the second internal gas inlet pipe.

10. The assembly as claimed in claim 9 wherein the first gas is $CO_2$.

11. The assembly as claimed in claim 8 further comprising:
a first external gas inlet pipe coupled to the mounting flange and to the first internal gas inlet pipe; and
a second external gas inlet pipe coupled to the mounting flange and to the second internal gas inlet pipe.

12. The assembly as claimed in claim 11 wherein the first and second first external gas inlet pipes each include a first portion oriented substantially perpendicular to the first and second internal gas inlet pipes, and a second portion substantially parallel to the first and second gas inlet pipes.

13. The assembly as claimed in claim 8 further comprising gas inlet pipe couplings disposed on each of the first and second internal gas inlet pipes at the internal surface of the mounting flange.

14. The assembly as claimed in claim 13 wherein a length of the gas inlet pipe couplings is selected to change a natural frequency of the first and second internal gas inlet pipes from a natural frequency induced from gas flowing through the first and second internal gas inlet pipes.

15. A gasifier comprising:
a gasifier housing having a reaction zone, for supporting a syngas reaction in a temperature range of up to about 2279° F.;
a mounting flange having an internal surface and coupled to the gasifier housing;
an injector barrel coupled to the mounting flange and configured to provide fuel to the reaction zone;
a first internal gas inlet pipe coupled to the mounting flange;
a second internal gas inlet pipe coupled to the mounting flange;
a cooling coil inlet coupled to the mounting flange;
cooling coils coupled to the cooling inlet, positioned around the injector barrel, and configured to be positioned internally in the gasifier housing; and
an internal gas injection header coupled to the first and second internal gas inlet pipes, the internal gas injection header positioned outside the reaction zone and subject to temperatures of about 1192° F.,
wherein the first and second internal gas inlet pipes are configured to provide a first gas into the reaction zone, and wherein the gas injector barrel is adjacent the internal gas injection header and the cooling coils, and configured to inject a second gas to mix with the first gas.

16. The assembly as claimed in claim 15 wherein the first internal gas inlet pipe is arranged substantially parallel to the second internal gas inlet pipe.

17. The assembly as claimed in claim 15 further comprising:
a first external gas inlet pipe coupled to the mounting flange and to the first internal gas inlet pipe; and
a second external gas inlet pipe coupled to the mounting flange and to the second internal gas inlet pipe.

18. The assembly as claimed in claim 17 wherein the first and second first external gas inlet pipes each include a first portion oriented substantially perpendicular to the first and second internal gas inlet pipes, and a second portion substantially parallel to the first and second gas inlet pipes.

19. The assembly as claimed in claim 15 further comprising gas inlet pipe couplings disposed on each of the first and second internal gas inlet pipes at the internal surface of the mounting flange.

20. The assembly as claimed in claim 19 wherein a length of the gas inlet pipe couplings is selected to change a natural frequency of the first and second internal gas inlet pipes from a natural frequency induced from gas flowing through the first and second internal gas inlet pipes.

* * * * *